United States Patent [19]

Gutsche et al.

[11] Patent Number: 5,137,376
[45] Date of Patent: Aug. 11, 1992

[54] COMB SEPARATOR FOR BALL BEARINGS

[75] Inventors: Horst Gutsche, Schweinfurt; Peter Dreschmann, Dittelbrunn, both of Fed. Rep. of Germany

[73] Assignee: Fag Kugelfischer Georg Schafer, Fed. Rep. of Germany

[21] Appl. No.: 748,288

[22] Filed: Aug. 21, 1991

[30] Foreign Application Priority Data

Aug. 22, 1990 [DE] Fed. Rep. of Germany ....... 4026504

[51] Int. Cl.$^5$ .......................... F16C 33/66; F16C 33/49
[52] U.S. Cl. ..................................... 384/470; 384/523; 384/531
[58] Field of Search ................. 384/470, 523, 526–531, 384/532–534

[56] References Cited

U.S. PATENT DOCUMENTS

| | | | |
|---|---|---|---|
| 980,082 | 12/1910 | Eitner | 384/531 |
| 1,915,288 | 6/1933 | Bott | 384/531 |
| 3,639,017 | 2/1972 | Schoen et al. | 384/470 |
| 4,941,759 | 7/1990 | Dreschmann et al. | 384/531 |

FOREIGN PATENT DOCUMENTS

| | | | |
|---|---|---|---|
| 0193058 | 9/1983 | European Pat. Off. | |
| 660911 | 6/1938 | Fed. Rep. of Germany | |
| 3811958 | 10/1989 | Fed. Rep. of Germany | 384/470 |
| 2136889 | 9/1984 | United Kingdom | 384/523 |

*Primary Examiner*—Thomas R. Hannon
*Attorney, Agent, or Firm*—Ostrolenk, Faber, Gerb & Soffen

[57] ABSTRACT

A comb separator or cage for ball bearings, including a ring that has a collar projecting axially out of one face. A groove extends around the distal face of the collar. The collar is separated into webs by spherical cavities that accommodate the balls. Lubrication ducts extend axially through the ring and the webs and open into the groove. The separator accordingly provides the lubricant with access to the balls from both sides and increases the reserve of lubricant. Preferably the grooves are approximately trapezoidal in their radial cross-section.

8 Claims, 1 Drawing Sheet

COMB SEPARATOR FOR BALL BEARINGS

BACKGROUND OF THE INVENTION

The invention concerns a comb separator or cage for ball bearings, of the type wherein a ring portion has a collar projecting axially out of one face, with a groove extending around its edge, and the collar is separated into webs which define spherical cavities to accommodate the balls.

Separators of this type are known from German Patent 660 911 and European Published Application 193 058. Each separator described in these two documents has a respective groove around the edge of its collar. The groove is primarily intended to make the sections of the webs that surround the ball more elastic to facilitate inserting the balls. It has a secondary function, however, of accumulating lubricant and channeling it directly to the balls. One drawback to this type of bearing is that the lubricant has access from only one side. Another is that the reserve of lubricant is never great.

Also of interest is DE-OS 38 21 613-A1, which is equivalent to U.S. Pat. No. 4,941,759, commonly assigned herewith.

All prior art mentioned herein is expressly incorporated by reference.

SUMMARY OF THE INVENTION

The primary object of the present invention is accordingly to improve a separator of the aforesaid type so that lubricant will have access from both sides, and to provide a substantial supply of lubricant.

This object is attained in accordance with the present invention by the improvement wherein lubrication ducts extend axially through the ring and the webs and open into the groove. With such lubrication ducts, the groove now obtains lubricant both directly from the side opposite the ring and through the ducts from the vicinity of the ring. The ducts simultaneously function as additional reservoirs of lubricant. Since they communicate directly with the groove, they are ideally positioned within the separator to channel the lubricant to the balls by the shortest route. Since the ducts parallel the axis of the bearing, the risk of lubricant being forced out centrifugally is slight.

Plastic comb separators are usually molded by machinery that includes axial mold slides. It is simple with this technology to provide the ducts with a more or less trapezoidal cross-section. Such ducts will accommodate more lubricant than round ducts will.

Other features and advantages of the present invention will become apparent from the following description of an embodiment of the invention which refers to the accompanying drawings.

BRIEF DESCRIPTION OF THE DRAWING

One embodiment of the invention will now be specified with reference to the drawings, wherein.

DETAILED DESCRIPTION OF AN EMBODIMENT OF THE INVENTION

Figure 2:
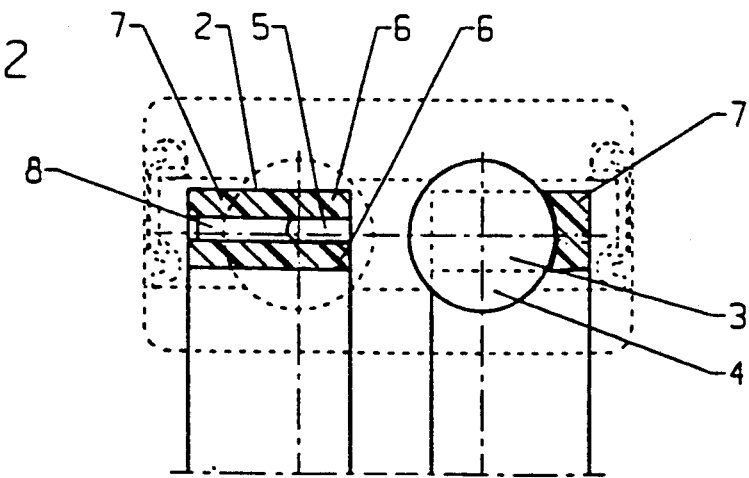
FIG. 2 is a radial cross-section of a two-row ball bearing assembly, taken through a web on the left, and through a ball-containing cavity on the right.
Figure 3:
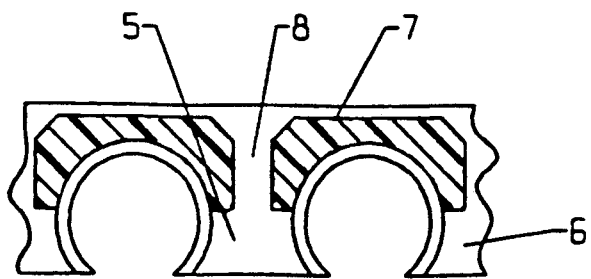
FIG. 3 is a circumferential sectional view taken through part of the ring portion of the separator illustrated in FIG. 1, along the midline thereof.

Referring to the figures, the comb-type ballbearing separator 1 comprises a ring portion 7 with a collar projecting axially out of one face. A circumferential groove 5 extends around the face of the collar that is remote from the ring portion. The ring portion is separated into webs 2 by spherical cavities 3 that accommodate the balls 4, which are snapped into the cavities. The process of snapping the balls 4 into the cavities 3 is facilitated by groove 5, which makes the four web portions 6 on each side of each cavity 3 more elastic. The webs 2 are, as shown particularly in FIG. 2, integral with the ring portion 7 of the separator 1.

Trapezoidal lubrication ducts 8 extend axially through both the ring portion 7 and the webs 2 into groove 5. This structure allows lubricant to enter separator 1 from the vicinity of ring portion 7 as well as from the vicinity of the balls 4. The ducts 8 on each side can also fill up with lubricant and serve as a reservoir. Since the ducts open into the groove where it has access to the balls, the lubricant will follow the shortest route to its ideal site of contact with the balls.

Figure 1:
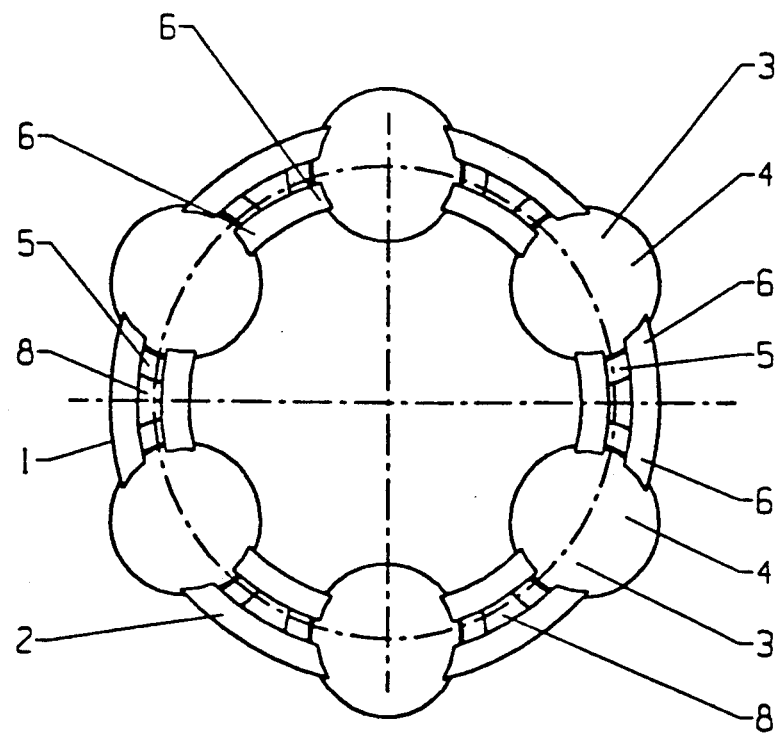
FIG. 1 is an axial view of a comb separator in accordance with an embodiment of the invention.

Preferably the ducts 8 are trapezoidal in radial cross-section, as shown best in FIG. 1, whereby the space inside webs 2 is optimally exploited. Trapezoidal ducts are especially easy to obtain in plastic separators, which are usually molded with the intervention of axial slides.

The present specification and claims are intended solely as illustrative of one or more potential embodiments of the invention and should not be construed as limiting it in any way. The invention may accordingly be adapted and modified in many ways that may occur to one of skill in the art without deviating from the theory behind it or exceeding the scope of its application.

What is claimed is:

1. A comb separator for ball bearings, comprising:
a ring portion having a collar projecting axially from one side thereof,
the collar being separated circumferentially into webs which define cavities between the webs for accommodating the ball bearings, the collar having a groove extending circumferentially along a face of the collar which is remote from the ring portion, and
a plurality of lubrication ducts extending axially through a ring portion and the webs and opening into the groove at a face of the collar remote from said ring portion.

2. A separator as in claim 1, wherein the ducts have a substantially trapezoidal cross-section.

3. A separator as in claim 2, wherein the trapezoidal cross-section of the ducts is defined by pair of opposed radial sides substantially equal in length and a pair of opposed circumferential sides having different lengths.

4. A separator as in claim 3, wherein the length of the opposed radial sides of the lubrication ducts is substantially equal to the radial dimension of the groove.

5. A separator as in claim 1, wherein the collar groove increases elasticity of web portions adjacent the cavities.

6. A separator as in claim 5, wherein the cavities are substantially spherical.

7. A separator as in claim 1, wherein the cavities are substantially spherical.

8. A separator as in claim 1, wherein each the web has at least one lubrication duct.

* * * * *